United States Patent

[11] 3,626,030

[72] Inventors Ernst Wolters;
Michael Lederer, both of Frankfurt am Main, Germany
[21] Appl. No. 12,144
[22] Filed Feb. 17, 1970
[45] Patented Dec. 7, 1971
[73] Assignee Farbwerke Hoechst Aktiengesellschaft vormals Meister Lucius & Bruning
Frankfurt am Main, Germany
[32] Priorities May 17, 1966
[33] Germany
[31] F 49223;
Nov. 25, 1966, Germany, No. F 50761
Continuation-in-part of application Ser. No. 634,487, Apr. 28, 1967, now Patent No. 3,531,451, Continuation-in-part of application Ser. No. 679,517, Oct. 31, 1967, now abandoned. This application Feb. 17, 1970, Ser. No. 12,144

[54] STABILIZED MACROMOLECULAR POLYACETALS AND PROCESS FOR MAKING THE SAME
10 Claims, No Drawings

[52] U.S. Cl........................................................ 260/895,
260/45.8 N, 260/45.95, 260/85.7, 260/86.1 N, 260/88.3 L

[51] Int. Cl........................................................ C08f 33/08
[50] Field of Search............................................ 260/895,
45.8 N, 88.3 L

[56] References Cited
UNITED STATES PATENTS
3,531,451 9/1970 Lederer et al. ............... 260/85.5
3,219,727 11/1965 Kray et al. .................... 260/874

*Primary Examiner*—Murray Tillman
*Assistant Examiner*—C. J. Seccuro
*Attorney*—Curtis, Morris and Safford ABSTRACT: Improved stabilization of polyacetals against thermal and oxidative degradation, particularly stabilization of homopolymers of formaldehyde or its cyclic oligomers and of copolymers of trioxane with cyclic ethers or cyclic acetals is obtained by using a stabilizing agent which is a homopolymer of a poly-N-vinyl-azetidinone or a copolymer of an N-vinyl-azetidione and a minor amount of an olefinically unsaturated comonomer or mixtures of such homopolymers and copolymers. The stabilizing agents may be used in an amount of 0.05 to 10 percent by weight. Further improvement in stabilization is achieved by using the poly-N-vinyl-azetidinone stabilizing agents in combination with conventional phenolic stabilizers in that a synergistic effect between the two types of stabilizers is obtained.

STABILIZED MACROMOLECULAR POLYACETALS AND PROCESS FOR MAKING THE SAME

This application is a continuation-in-part of U.S. application Ser. No. 634,487 filed Apr. 28, 2967 now U.S. Pat. No. 3,531,451 and of U.S. application Ser. No. 679,517 filed Oct. 31, 1967 now abandoned. The claims of this application are directed to the stabilized polyacetals and method of making the same disclosed in application Ser. No. 679,517.

The present invention relates to the stabilization of macromolecular polyacetals. Processes are already known for making macromolecular polyacetals by polymerizing monomeric formaldehyde or oligomers of formaldehyde, for example, trioxane, in the presence of various catalysts. The polymers so obtained contain unstable terminal hydroxyl groups and are completely depolymerized within a short time with reformation of monomeric formaldehyde on being heated to a temperature above their melting point. This degradation reaction can be prevented to a certain extent by blocking the terminal groups.

Copolymers of formaldehyde or of oligomers of formaldehyde with cyclic acetals and cyclic ethers are also known. They contain ether bonds in addition to acetal bonds in the polymer chain so that products which are more heat resistant are obtained.

However, both the homopolyacetals containing stabilized terminal groups and the copolymers containing some stable ether bonds in the chain are more or less unstable under the action of heat produced, for example, when the products are processed on the usual processing machines. It has therefore been proposed to mix the polymers with various stabilizers, for example, phenols, amines, hydrazines, ureas, thioureas and polyamides. The stabilizing action of these substances is due to their capacity to intercept the aldehydes formed in the thermal cleavage and their secondary products, to block the active centers occurring in the polymer and thus to prevent depolymerization. Their effectiveness differs widely. Hydrazine-, urea- or thiourea-derivatives have an unsatisfactory stabilizing action as regards heat and oxygen. Phenols and amines give rise to discoloration of the polyacetals and in many cases diffuse out of the polymer or can be removed therefrom by solvents.

In view of these drawbacks of the aforesaid substances, polymeric stabilizers which are generally difficulty volatile and cannot be removed from the polyacetals by the usual solvents are of particular interest. Thus it has been proposed to stabilize macromolecular polyacetals using polymers of N-vinyl lactams of the general formula:

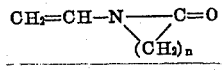

in which $n$ is a whole number within the range of 3 to 7.

Now we have found that polymers of N-vinyl-azetidinones of the following formula:

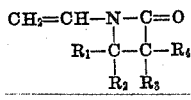

have a considerably improved stabilizing action against thermal and oxidative degradation of polyacetals as compared with the known poly-N-vinyl lactams and impart an improved resistance to ageing to macromolecular polyacetals.

In the above formula R1 to R4 may be the same or different and may be hydrogen atoms, aliphatic radicals with one to 12 carbon atoms, alicyclic and/or aromatic radicals. The aliphatic radicals may be straight-chained or branched. Representative radicals are: $CH_3$, $C_2H_5$, n-$C_4H_9$, n-$C_5H_{11}$, n-$C_6H_{13}$, n-$C_7H_{15}$, n-$C_8H_{17}$, n-$C_9H_{19}$, n-$C_{10}H_{21}$, n-$C_{11}H_{23}$, n-$C_{12}H_{25}$, i-$C_3H_7$, i-$C_4H_9$, sec.-$C_4H_9$, i-$C_5H_{11}$, i-$C_6H_{13}$, i-$C_7H_{15}$, i-$C_8H_{17}$, i-$C_9H_{19}$, i-$C_{10}H_{21}$, i-$C_{11}H_{23}$, i-$C_{12}H_{15}$, aliphatic 5- or 6-membered rings such as cyclopentyl or cyclohexyl, an unsubstituted phenyl radical or a substituted phenyl radical, such as the p-tolyl, xylyl, methoxy phenyl, chlorophenyl and fluorophenyl radicals. $R_1$ to $R_4$ are preferably alkyl groups of one to four carbon atoms.

The structure of the above poly-N-vinyl-azetidinones differs from that of the known poly-N-vinyl lactams in that

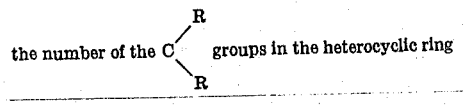

which is bound to the polymer chain via the nitrogen atom as a side group, is smaller than 3 and that the hydrogen atoms in the ring may be replaced wholly or partially by aliphatic, alicyclic and/or aromatic radicals.

The stabilization of the polyacetals may also be carried out using copolymers of N-vinyl-azetidinones with a minor amount of an ethylenically unsaturated comonomer such as acrylic and methacrylic acid esters of alkanols having one to 12 carbon atoms, vinyl esters of carboxylic acids having one to 19 carbon atoms, substituted or unsubstituted acrylamides, N-vinyl lactams with 5 to 7 members in the ring and/or N-vinyl amides.

Examples of azetidinone polymers suitable for use according to the present invention are poly-N-vinyl-4-methyl-azetidinone, poly-N-vinyl-4,4-dimethyl-azetidinone, poly-N-vinyl-3,4-dimethyl-azetidinone, poly-N-vinyl-4-phenyl-azetidinone and copolymers of N-vinyl-4,4-dimethyl-azetidinone and N-vinyl-N-methyl-formamide in a ratio of 85:15 to 68:32 parts by weight, respectively. The polymers and copolymers used as stabilizing agents in accordance with the invention may be added in an amount within the range of 0.05 to 10 percent by weight, advantageously 0.1 to 2 percent by weight, based on the weight of the macromolecular polyacetal.

The effectiveness of the stabilizers in accordance with the invention may be further considerably enhanced by the addition of 0.01 to 10 percent by weight, advantageously 0.1 to 5 percent by weight, based on the weight of the polyacetal, of a known antioxidant, e.g., a phenolic antioxidant such as phenol or a substituted phenol. Particularly effective are bisphenols, for example, 2,2'-methylene-bis-(4-methyl-6-tert. butylphenol) and 4,4'-butylidene-bis-(6-tert. butyl-3-methylphenol). When the stabilizers of the invention are used in combination with these antioxidants, a pronounced synergistic effect is obtained. A small amount of these substances is therefore sufficient to obtain a satisfactory stabilizing effect. By the addition of known light stabilizers, for example, benzophenone-, acetophenone- or triazine-derivatives, the properties of the polyacetals stabilized by the process of the invention may be still further improved to obtain products of high utilitarian value.

The polymers of N-vinyl-azetidinone derivatives are easy to manufacture and to use. By polymerization of monomeric N-vinyl-azetidinones in an inert solvent, they are obtained, for example, in the form of a fine powder and may be incorporated in that form into the polyacetal with the help of a commercial mixer. It is also possible to mix a solution of the stabilizer in an appropriate solvent with the polyacetal, while stirring, and then to evaporate the solvent.

To illustrate the manner in which the N-vinyl-azetidinone homopolymers and copolymers used in the present compositions may be prepared, the following examples of their preparation are given:

EXAMPLE A

10 Grams of N-vinyl-4,4-dimethylazetidinone were polymerized in bulk with 0.1 gram of azo-bis-isobutyric acid nitrile as a catalyst at about 80° C. After 8 hours, a solid colorless polymer was obtained. After dissolution and reprecipitation from chloroform/ether, there were obtained 5.5 grams of a polymer having a reduced specific viscosity of 0.86. The turbidity point of the 5 percent aqueous solution was at 39.4° C.

EXAMPLE B

10 Grams of N-vinyl-4,4-dimethylazetidinone and 10 grams of vinyl acetate were polymerized in bulk with 0.1 gram of azo-bis-isobutryric acid nitrile at 80° C. After a period of 8 hours, the colorless copolymer obtained was dissolved in chloroform and precipitated with diethyl ether. There were obtained 10.2 grams of a copolymer having a nitrogen content of 7.5 percent corresponding to 67 percent by weight of beta-lactam which had been incorporated by polymerization. The reduced specific viscosity of the copolymer was 0.33.

EXAMPLE C

8 Grams of N-vinyl-3,4-dimethylazetidinone and 2 grams of methylacrylate were polymerized in bulk with 0.05 grams of azo-bis-isobutyric acid nitrile as the catalyst at 80° C. for 7 hours. The colorless copolymer obtained was dissolved in chloroform and reprecipitated with diethyl ether. There were obtained 5 grams of a copolymer having a nitrogen content of 7.2 percent. The reduced specific viscosity was 1.05.

EXAMPLE D

10 Grams of N-vinyl-3,4-dimethyl-azetidinone was polymerized in 10 grams of methanol with 0.05 gram of azo-bis-isobutyric acid ester at 80° C. under exclusion of air. The polymer was then isolated by precipitation with diethyl ether and dried at 70° C. in vacuo. The yield of polymer was 9.1 grams and it had a reduced specific viscosity of 0.53.

EXAMPLE E

10 Grams of N-vinyl-4-phenyl-azetidinone was polymerized in 50 grams of benzene with 0.05 gram of azo-bis-isobutyric acid ester at 80° C. and under the exclusion of air. The polymer was then isolated by precipitation with diethyl ether and dried at 70° C. in vacuo. A yield of 2 grams of polymer was obtained having a reduced specific viscosity of 0.041 measured in chloroform.

EXAMPLE F

In a reaction vessel provided with a stirrer, a reflux condenser, a thermometer and a dropping funnel, 680 cc. of water and 0.8 cc. of a 25 percent $-ND_3$-water were heated to a temperature of 85° C. Under an atmosphere of $N_2$, 160 grams of N-vinyl-4-methyl-azetidinone containing 0.4 gram of azo-bis-isobutyric acid nitrile, were added dropwise over a period of 30 minutes, while stirring. After a polymerization period of 8 hours, the aqueous solution of the polymer still contained 0.2 percent by weight of residual monomer, corresponding to a conversion rate of 99 percent. The reduced specific viscosity of the product dissolved and reprecipitated from a mixture of $CHCl_3$ and ether, was 1.08. The surface tension of the 1 percent solution in water was 61.3 dyn/cm. (at 20° C.).

EXAMPLE G

In an apparatus as described in example F, 50 grams of N-vinyl-4,4-dimethylazetidinone were polymerized in 600 cc. of gasoline (boiling point 80°–110° C.) with 0.5 grams of azo-bis-isobutyric acid nitrile as the catalyst at a temperature in the range of from 87° to 90° C. There were obtained 37 grams of a polymer having a reduced specific viscosity of 0.17. The turbidity point of a 5 percent aqueous solution was at 36° C. The surface tension of a 1 percent aqueous solution was 48.7 dyn/cm. (at 20° C.).

EXAMPLE H

In an apparatus as described in example F, 324 cc. of gasoline having a boiling point in the range of from 80° to 110° C. were heated to a temperature of about 90° C. In the gasoline 10 grams of 2-ethylhexyl acrylate were polymerized with 0.05 gram of azo-bis-isobutyric acid nitrile for 30 minutes until a conversion rate of about 50 percent was achieved. Thereafter a mixture of 80 grams of N-vinyl-3,4-dimethylazetidinone, 10 grams of N,N-dimethyl acrylamide, 0.5 gram of azo-bis-isobutyric acid nitrile and 162 cc. of gasoline was added dropwise over a period of 45 minutes. The polymer separated as a powder. After a polymerization period of 4 hours, there were obtained 93.2 grams of a copolymer having a reduced specific viscosity of 1.15. The copolymer contained 10.55 percent of nitrogen (determined by Dumas). By decomposing the copolymer with HCl, 1.3 percent of nitrogen was obtained since only dimethylamine-nitrogen was ascertained by this method. The copolymer separated from its turbid 5 percent aqueous solution at 45°–46° C.

EXAMPLE J

In an apparatus as described in example F, 324 cc. of gasoline having a boiling point in the range of from 80° to 110° C. were heated to a temperature of about 90° C. A solution of 128.56 grams of N-vinyl-4-methylazetidinone, 32.14 grams of maleic acid bis-2-ethylhexyl ester, 0.5 gram of azo-bis-isobutyric acid nitrile and 162 cc. of gasoline was added thereto, while stirring, over a period of 45 minutes. The copolymer separated as a powder and, after a period of 4 hours, 150 grams of a copolymer having a reduced specific viscosity of 1.59 was obtained. The composition was calculated from the nitrogen content of 10.6 percent (by Dumas), which indicated 84 percent by weight of N-vinyl-4methylazetidinone and 16 percent by weight of maleinate.

In the foregoing examples A to D and F to J the reduced specific viscosities were measured at 20° C. using a 1 percent by weight solution of the polymer in methanol. It will be noted that the viscosities of the polymers fall within the range 0.15 to 1.6, thus indicating an approximate molecular weight range of 30,000 to 300,000. While polymers having molecular weights outside this range can be used as stabilizing agents in accordance with the present invention, those having molecular weights within this range are preferred. Monomer N-vinyl-azetidinones are prepared by cleavage of corresponding N-($\alpha$-alkoxyethyl)-azetidinones in the presence of acid catalysts at temperatures of from 50° to 300° C. The N-($\alpha$-alkoxyethyl)-azetidinones are obtained by reaction of azetidinones-(2) with acetals or semiacetals of acetaldehyde in the presence of acid catalysts at temperatures of from 10° to 200° C.

To illustrate the manner in which the monomer N-vinyl-azetidinones may be prepared, the following examples are given:

EXAMPLE K a. A mixture of 495.5 grams of 4,4-dimethylazetidinone-(2), 1046 grams of acetaldehyde diisobutyl acetal, 37 grams of isobutanol, 110 grams of acetaldehyd and 2,5 grams of iron (III) chloride was refluxed for 4 hours at 70 to 80° C. After cooling the mixture was neutralized with a 30 percent aqueous solution of potassium hydroxide and fractional distilled. There were obtained 438 grams of N-($\alpha$-isobutoxy-ethyl)-4,4-dimethylazetidinone-(2) boiling at 114° C. under 8 torr and having a refractive index $n_D^{20}$ of 1.4453. b. in a four-necked flask provided with stirrer, sump thermometer, nitrogen inlet tube, distilling column and dropping funnel, 50 grams of N-($\alpha$-isobutoxyethyl)-4,4-dimethyl-azetidinone-(2), in which 50 milligrams of $H_3PO_4$ had been dissolved, were heated at 125° C. under a pressure of 40 torr, whereby cleavage occurred. In the same measure as the cleavage products distilled off, further 149 grams of N-($\alpha$-iso-butoxyethyl)-4,4-dimethyl-azetidinone-(2), containing 1 percent of $H_3PO_4$, were dropped in. The sump temperature was maintained at 135° to 140° C., the temperature at the head being kept at 110° C. by regulation of the reflux ratio. In this manner only small amounts of starting material which had not undergone cleavage distilled off. After distillation of the reaction mixture there were obtained 90 grams of pure N-vinyl-4,4-dimethylazetidinone-(2) boiling at 79° C. under 12.5 torr.

EXAMPLE L a. Corresponding to example K and starting from 851 grams of 4-methylazetidinone-(2), 310 grams of acetaldehyd, 1743 grams of acetaldehyde diisobutyl acetal and 6 grams of anhydrous iron (III)chloride there are obtained 1520 grams of N-(α-iso-butoxyethyl)-4-methylazetidinone-(2) boiling at 107° C. under 8 torr and having a refractive index $n_D^{20}$ of 1.4432.

b. In a four-necked flask equipped as described in example K b 150 grams of N-(α-isobutoxyethyl)-4-methylazetidinone-(2) and 75 grams of acid aluminum oxide were heated in a nitrogen atmosphere while stirring under a pressure of 90 torr. Cleavage set in at 135° C. The procedure was continued as described in example K b while maintaining a boiling limit of 110° C. During the course of 7 hours 770 grams of N-(α-isobutoxy-ethyl)-4-methylazetidinone-(2) had undergone cleavage. When the cleavage products were distilled, 400 grams of pure N-vinyl-4-methyl-azetidinone-(2) boiling at 71° to 72° C. under 9 torr were obtained. The yield corresponded to 87 percent of the theory.

EXAMPLE M a. A mixture of 73.5 grams of 4-phenylazetidinone-(2), 261.5 grams of acetaldehyde diisobutyl acetal, 0.2 gram of anhydrous iron(III)chloride and 13 grams of acetaldehyde was heated slowly at 65° C. and then maintained at this temperature for 3 hours. After cooling the mixture was neutralized with a 30 percent solution of sodium hydroxide in isobutanol and distilled. At a temperature of 99° to 105° under a pressure of 0.05 torr there were obtained 100 grams of N-(α-isobutoxyethyl)-4-phenyl-azetidinone-(2) having a refractive index $n_D^{20}$ of 1.5084. After some time the colorless viscous oil crystallized and then had a melting point of 63° to 64° C. of 15 centimeters and containing spirals, 99 grams of N-(α-isobutoxyethyl)-4-phenyl-azetidinone-(2) and 5 grams of acid aluminum oxide were heated under a pressure of 0.2 torr. Cleavage took place at 155 to 160° C. and was terminated after 45 minutes. The separated isobutanol was condensed in a cooling trap. The vinyl compound was then separated from the aluminum oxide by distillation. By fractionating distillation 48.5 grams of pure N-vinyl-4-phenyl-azetidinone-(2) boiling at 100° to 101° C. under 0.2 torr were obtained. The conversion was 77.5 percent and the yield was 90 percent of the theory.

The stabilizers in accordance with the invention are excellently compatible with the polyacetals and do not influence the mechanical and technological properties of the polymers. They have the particular advantage that, contrary to most stabilizers of low molecular weight, they do not diffuse out of the polymer and cannot be removed therefrom by the usual solvents. Owing to this fact, the stability of products that have been stabilized with these substances is preserved even after a prolonged exposure to elevated temperatures and after contact with solvents.

The stabilizers of the invention are colorless and prevent discoloration of the polymers thus stabilized, even when the latter are exposed for a prolonged time to heat, light and oxygen. Finally, the substances in accordance with the invention provide excellent protection of macromolecular polyacetals against thermal oxidative depolymerization and improve their resistance to ageing and are in this respect considerably superior to poly-N-vinyl lactams of similar structure with 3 to 7 $CH_2$ groups in the ring.

The term "macromolecular polyacetals" is used herein to mean:

1. homopolymers of formaldehyde or its cyclic oligomers, for example, trioxane, in which the terminal hydroxyl groups have been blocked by esterification or etherification, and (2) copolymers of trioxane and cyclic ethers or cyclic acetals which contain oxyalkylene groups with at least 2, advantageously 2 to 4, neighboring carbon atoms in the main polymer chain. The amount of oxyalkylene groups may be within the range of 0.1 to 50 percent by weight, advantageously 0.1 to 15 percent by weight, based on the total polymer weight. Such copolymers can be easily obtained in known manner, for example, by cationic copolymerization of trioxane with cyclic ethers and/or cyclic acetals. Comonomers that are particularly suitable for the manufacture of the polymers are ethylene oxide and its derivatives, oxacyclobutane, and cyclic formals, for example, of glycols such as 1,3- or 1,4-butanediol, diethylene glycol or 1,4-butenediol.

To determine the stability of the polyacetals against heat and oxidation, the loss in weight of a granular sample in 30 minutes at 230° C. under oxygen was measured. The resistance to ageing was determined on compressed plates 0.5 mm. thick by annealing at 120° C. in a circulating air drier.

The following examples serve to illustrate compositions embodying the invention and methods of making such compositions, but are not intended to limit the scope of the invention. In the examples parts are given by weight.

In the tables given in the examples, the test results ascertained with the stabilizers of the invention have been compared with those obtained in test samples stabilized with the known poly-N-vinyl lactams having at least 5 ring atoms. The tests were carried out with polyacetals which had a solution viscosity of 0.3 to 3 dl/g, advantageously 0.5 to 2 dl/g, determined in a 0.5 percent solution of the polymer in butyrolactone with the addition of 2 percent diphenylamine as a stabilizer.

EXAMPLE 1

100 parts of an acetal copolymer of 98 parts of trioxane and two parts of ethylene oxide were intimately mixed in an impeller with two, five and eight parts, respectively, of the compounds indicated in the following table 1 and granulated on a commercial extruder. After the granular product had been dried for 2 hours at 100° C. in a vacuum drier, the stability was measured by determination of the loss in weight of a granular sample in 30 minutes at 230° C. in air.

The granular product was furthermore made into compressed plates 0.5 mm. thick and the resistance to ageing at elevated temperatures was determined by annealing at 120° C. in a warming cabinet.

TABLE 1

| Stabilizer | Amount in percent by weight | Percentage loss in weight at 230° C. in 30 min. in air | Embrittlement at 120° C. in warming cabinet in days |
|---|---|---|---|
| Without stabilizer (comparison) | | 80 | (¹) |
| Poly-N-vinyl-pyrrolidone (comparison) | 2 | 7.9 | 1 |
| Poly-N-vinyl caprolactam (comparison) | 2 | 5.6 | 1 |
| Poly-N-vinyl-4-methyl-azetidinone | 2 | 4.4 | 4 |
| Poly-N-vinyl-3,4-dimethyl-azetidinone | 2 | 3.9 | 4 |
| Poly-N-vinyl-4-methyl-azetidinone | 5 | 2.8 | 3 |
| Poly-N-vinyl-3,4-dimethyl-azetidinone | 8 | 2.3 | 3 |

¹ Completely brittle after 1 day.

EXAMPLE 2

100 Parts of an acetal copolymer of 98 parts of trioxane and two parts of ethylene oxide were intimately mixed with different amounts of the substances indicated in the following table 2 and with 0.5 part of 2,2'-methylene-bis-(4-methyl-6-tert. butyl-phenol) and granulated on a commercial extruder. The stability was determined on granulated samples under oxygen while the resistance to ageing was measured on compressed plates 0.5 mm. thick as described in example 1.

TABLE 2

| Stabilizer | Amount in percent by weight | Costabilizer | Amount in percent by weight | Percentage loss in weight at 230° C. in 30 min. in oxygen | Embrittlement at 120° C. in warming cabinet in days |
|---|---|---|---|---|---|
| Poly-N-vinylpyrrolidone | 0.1 | 2,2'-methylene-bis-(4-methyl-6-tert. butylphenol) | 0.5 | 3.2 | 1 |
| Do | 0.3 | do | 0.5 | 3.4 | 1 |
| Do | 0.5 | do | 0.5 | 2.6 | 1 |
| Poly-N-vinylcaprolactam | 0.1 | do | 0.5 | 3.5 | 2 |
| Do | 0.3 | do | 0.5 | 4.1 | 1 |
| Do | 0.5 | do | 0.5 | 3.6 | 1 |
| Poly-N-vinyl-4-methylazetidinone | 0.1 | do | 0.5 | 2.4 | 8 |
| Do | 0.3 | do | 0.5 | 1.9 | 7 |
| Do | 0.5 | do | 0.5 | 1.8 | 7 |
| Poly-N-vinyl-3,4-dimethylazetidinone | 0.1 | do | 0.5 | 2.2 | 7 |
| Do | 0.3 | do | 0.5 | 2.0 | 5 |
| Do | 0.5 | do | 0.5 | 2.0 | 4 |

EXAMPLE 3

A copolymer of trioxane and 4 percent by weight of 1,3-dioxolane was intimately mixed with 0.7 percent by weight of 4,4'-butylidene-bis-(6tert. butyl-3-methyl-phenol) and 0.2 percent by weight of one of the stabilizers indicated in the following table 3. After granulating, the loss in weight of the test samples was determined after heating for 30 minutes at 230° C. in air. Table 3 shows that the stabilizers in accordance with the invention are superior to the stabilizers used for comparison.

TABLE 3

| Stabilizer | Percentage loss in weight at 230° C. after 30 minutes in air |
|---|---|
| poly-N-vinyl-pyrrolidone (comparison) | 6.8 |
| poly-N-vinyl-4-methyl-azetidinone | 3.2 |
| poly-N-vinyl-3,4-dimethyl-azetidinone | 4.1 |

EXAMPLE 4

An acetylated homopolymer of formaldehyde which had been stabilized with 0.7 percent by weight of 2,2'-methylene-bis-(4-methyl-6-tert. butyl-phenol) and 0.3 percent by weight of poly-N-vinyl-3,4-dimethyl-azetidinone was made into compressed plates which were stored at 120° C. in a circulating air drier. Almost no discoloration was observed. Nor did a test sample which had been stabilized in the same manner and heated for 30 minutes at 230° C. in a closed mold undergo any discoloration. The loss in weight of the polymers containing the above stabilizer combination was 2.8 percent after 30 minutes at 230° C. in air.

The macromolecular polyacetals stabilized by the process of the invention may advantageously be used for the manufacture of various kinds of thermoplastic molding masses, for example, films, sheets, plates, ribbons and containers. They can be processed according to the usual methods, for example, by extrusion and injection molding.

We claim:

1. A process for stabilizing macromolecular polyacetals against the simultaneous action of heat and oxygen, said polyacetal being a homopolymer of formaldehyde or its cyclic oligomers or a copolymer of trioxane and cyclic ethers or cyclic acetals, which copolymer contains oxalkylene groups with at least two adjacent carbon atoms in the main polymer chain, said process comprising incorporating in the polyacetal as a stabilizer from 0.05 to 10 percent by weight of a nitrogen containing polymer selected from the group consisting of (1) homopolymers of a N-vinyl-azetidinone of the formula

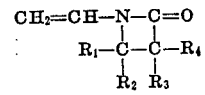

in which $R_1$ to $R_4$ each represents a hydrogen atom, a straight chained or branched aliphatic radical with one to 12 carbon atoms, an alicyclic or aromatic radical, (2) copolymers comprising a major amount of said N-vinyl-azetidinone and (3) mixtures of said homopolymers and said copolymers.

2. A process according to claim 1 wherein a mixture of said nitrogen-containing polymer with another antioxidant or light stabilizer or with a mixture of another antioxidant and light stabilizer is incorporated in said polyacetal.

3. A thermoplastic, moldable polyacetal which is a macromolecular homopolymer or formaldehyde or its cyclic oligomers or a copolymer of trioxane and cyclic ethers or cyclic acetals, which copolymer contains oxalkylene groups with at least two adjacent carbon atoms in the main polymer chain, said polyacetal having incorporated therein as a a nitrogen containing polymer selected from the group consisting of (1) homopolymers of a N-vinyl-azetidinone of the formula

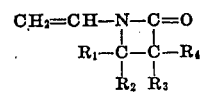

in which $R_1$ to $R_4$ each represents a hydrogen atom, a straight chained or branched aliphatic radical with one to 22 carbon atoms, an alicyclic or aromatic radical, (2) copolymers comprising a major amount of said N-vinyl-azetidinone and (3) mixtures of said homopolymers and said copolymers wherein $R_1$ to $R_4$ are selected from alkyl radicals having one to four carbon atoms.

4. A stabilized polyacetal according to claim 3 wherein $R_1$ to $R_4$ are selected from alkyl radicals having one to four carbon atoms.

5. A stabilized polyacetal according to claim 3 wherein said N-vinyl-azetidinone polymer is poly-N-vinyl-4-methyl-azetidinone.

6. A stabilized polyacetal according to claim 3 wherein said N-vinyl-azetidinone polymer is poly-N-vinyl-4,4-dimethyl-azetidinone.

7. A stabilized polyacetal according to claim 3 wherein said N-vinyl-azetidinone polymer is poly-N-vinyl3,4-dimethyl-azatidinone.

8. A stabilized polyacetal according to claim 3 wherein said N-vinyl-azetidinone polymer is poly-N-vinyl-4-phenyl-azetidinone.

9. A stabilized polyacetal according to claim 3 wherein said N-vinyl-azetidinone polymer is a copolymer of N-vinyl-4,4-dimethyl-azetidinone and N-vinyl-N-methyl-formamide.

10. A stabilized polyacetal according to claim 3 containing in addition to said N-vinyl-azetidinone polymer from 0.01 to 10 percent by weight of a phenolic antioxidant.

* * * * *